INVENTOR
Wayne E. Hughes

United States Patent Office 3,210,675
Patented Oct. 5, 1965

3,210,675
HARMONIC COUPLING PLUS PUSH-PUSH PUMPING FOR MASER
Wayne E. Hughes, Laurel, Md., assignor to Westinghouse Electric Corporation, East Pittsburgh, Pa., a corporation of Pennsylvania
Filed Sept. 16, 1964, Ser. No. 396,981
7 Claims. (Cl. 330—4)

The present invention relates generally to a device for microwave amplification by stimulated emission or radiation, commonly known as a maser, and more particularly relates to a maser capable of operation in the millimeter wave portion of the spectrum with a signal frequency substantially greater than the pumping frequency.

It is desirable to provide a maser capable of operation at a frequency near 100 gigacycles. Unless the signal to pump frequency ratio is substantially greater than unity operation in the hundred gigacycle range would require a pump tube which is difficult to attain. The lower the pump frequency the easier it is to obtain tubes for pumping.

The present invention allows the use of a pump source of significantly lower frequency compared to the signal frequency of the maser by combining an active material capable of providing energy levels separated in the prescribed relationship and a pumping mode of operation of harmonic coupling and multiple level pumping to obtain a significant signal to pump frequency ratio. Briefly, the present invention combines direct multiple level pumping of two energy level pairs and harmonic coupling of yet another energy level pair of an active material to selectively depopulate one of the spin states of the harmonically coupled pair of energy levels and enhance amplification at a frequency substantially greater than the pump frequency. The harmonic coupling parameter between the yet another energy level pair need not be very large and can depopulate its lower energy level to a small extent and still maintain a significant signal to pump ratio.

Accordingly, an object of the present invention is to provide a maser having a signal to pump frequency ratio substantially greater than unity.

Another object of the present invention is to provide a maser capable of operation at a signal frequency in the 100 gigacycle range.

Yet another object of the present invention is to provide a maser in which harmonic coupling and multiple level pumping is used to obtain population inversion of the appropriate spin levels.

Further objects and advantages of the present invention will be readily apparent from the following detailed description taken in conjunction with the drawing, in which.

Figure 1:
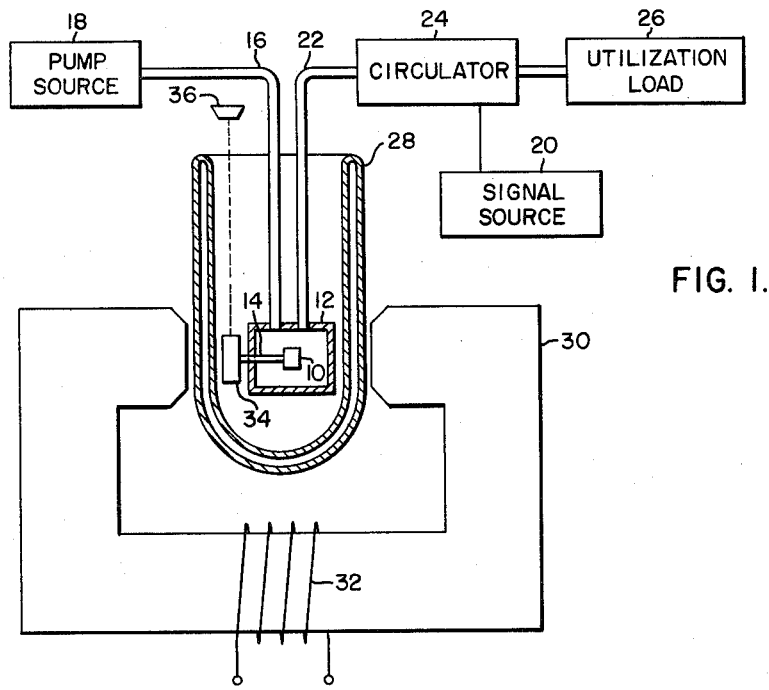
FIGURE 1 is a schematic diagram of an illustrative embodiment of a maser in accordance with the present invention.

A diagrammatic illustration of the maser is shown in FIG. 1. An active material 10 of iron ions, $Fe^{3+}$, in a host crystalline structure of rutile, $TiO_2$, is positioned within a cavity 12 by a rod 14. One active material of suitable type is a sample of rutile having a ratio of Ti/Fe ions of approximately $10^3$. A pump waveguide 16 connects the cavity 12 to a pump source 18 such as a klystron. A signal source 20 is connected to the cavity 12 through a signal waveguide 22 and a circulator 24 which also connects a load 26 to the signal waveguide 22. When desirable, a Dewar assembly 28 surrounds the maser cavity 12 thereby maintaining the active material 10 at a temperature in the range of 2.2 to 4.2° K. A magnetic field for the active material 10 is provided by a large electromagnet 30 having an electrical input circuit 32 to control the strength of the magnetic field H. A gear box 34 drives the rod 14 through a linkage 36 to control the orientation of the active material 10 within the magnetic field.

Figure 2:
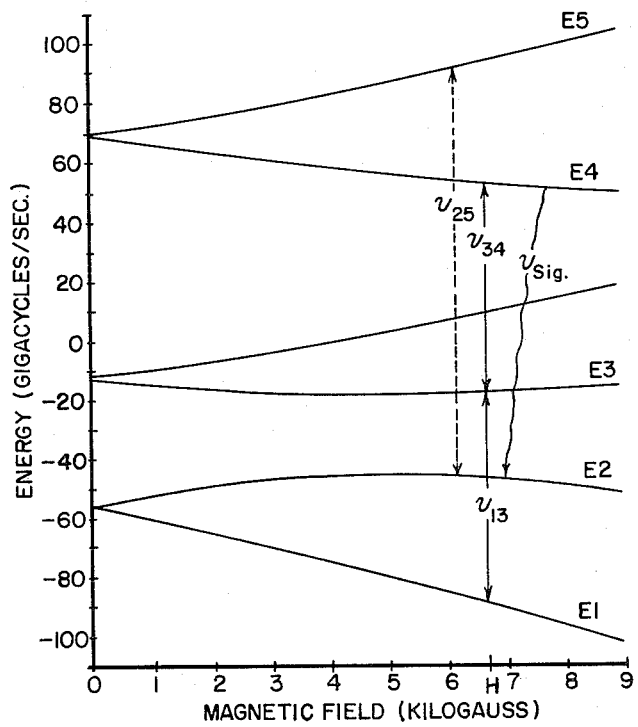
FIG. 2 is an energy level diagram presented for a better understanding of the present invention.

To explain the maser operation, the energy level distribution versus magnetic field for iron ions in rutile is shown in FIG. 2. The ground state spin energy levels of the iron ion are split by the crystalline electric field of the host structure to give three Kramers doublets separated by 43.268 and 81.375 gigacycles. The spin degeneracy of the doublets is further removed by the application of an external magnetic field giving a total of $2S+1=6$ available spin energy levels designated in order of increasing magnitude E1, E2, E3, E4 and E5. The additional energy level disposed between the energy levels E3 and E4 occurs when using iron ions in rutile but is not identified since that energy level plays no part in the operation of the present invention.

Solution of the Spin Hamiltonian, which describes the spin levels as a function of the angular orientation of the active material and applied magnetic field indicates that the active material 10 should be orientated with respect to the magnetic field at an angle $\theta=63°$ and $\phi=42°$ to provide the energy level separations shown in FIG. 1. The angle $\theta$ is defined as the angle between the direction of the applied field and the [110] crystalline axis and $\phi$ represents the angle between the projection of the magnetic field direction on the (110) plane and the [110] crystal axis.

It is seen from the energy level diagram that when the applied field H is essentially 6.735 kilogauss, the transition frequencies $$v_{ij}v_{13}=v_{34}=1/2v_{25}=70.80$$

where $$\nu_{ij}=\frac{E_j-E_i}{h}$$

and $h$ is Planck's constant. The rate equations which will describe the population density of the various states are given by $$\dot{n}_i=\sum_j(\omega_{ji}n_j-\omega_{ij}n_i)+\sum_j W_{ij}(n_j-n_i)+W_c f_n$$

where
$\omega_{ji}=\omega_{ij}e^{\alpha v_{ij}}$=spin lattice transition probability,
$W_{ij}=W_{ji}$=radiation induced transition probability,
$W_c f_n$ is a harmonic coupling term which is proportional to the order of the harmonic, spin densities and doping ion concentration, and $$\alpha=\frac{h}{kT}$$

Figure 3:
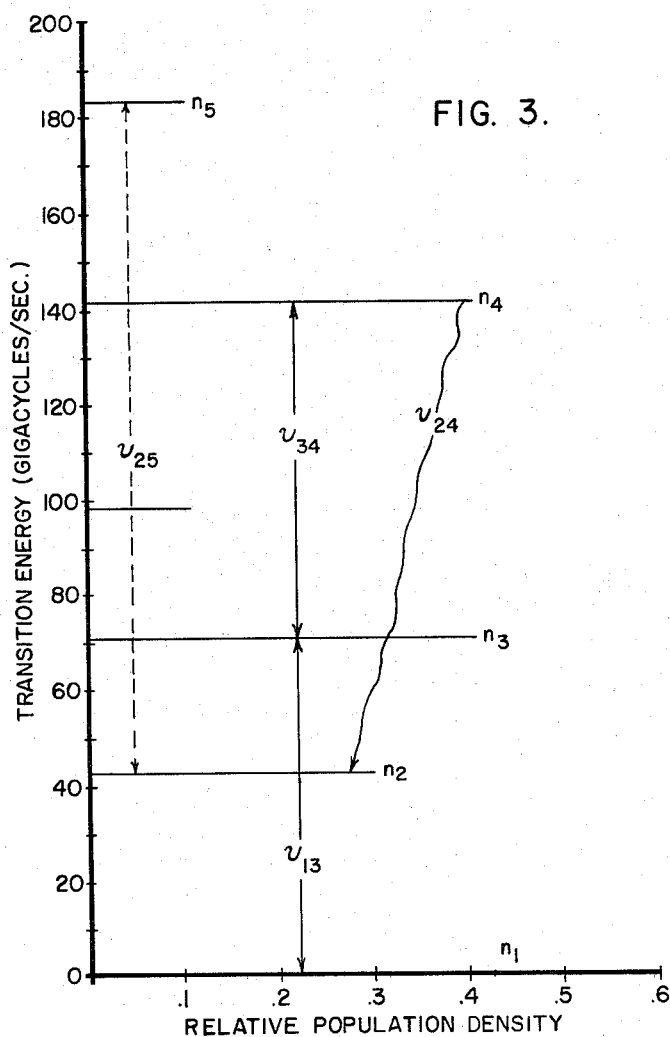
FIG. 3 is a population distribution graph useful in explaining the operation of the present invention under particular conditions.

The spin population of the energy levels of interest after the pump power is applied is shown in FIG. 3. It is assumed that the relaxation times between the energy levels is approximately equal.

If a large, saturating pump signal $N_p$ at transition frequency $v_{13}=v_{34}$ is applied to the system and all other radiations are excluded, then the relative population densities $n$ of energy levels E1, E3 and E4 will be equal, $n_1=n_3=n_4$. By harmonic coupling in the active material, the population of energy level E2 will decrease while the population of energy level E5 will increase, assuming the transition frequency $v_{25}$ is harmonically related to the pump frequency. Maser action will be allowed at a frequency $\nu_{24}$ when the population density of energy level E4 is greater than the population density of energy level E2. The population density of energy levels E4 and E2, i.e., $n_4$ and $n_2$, at equilibrium can be found from the following two rate equations and the conservation conditions:

$N = 3n_4 + n_2 + n_5$ $n_2 = n_4(\omega_{12} + \omega_{32} + \omega_{42}) - n_2(\omega_{21} + \omega_{23} + \omega_{24} + \omega_{25} + W_c)$
$\phantom{n_2 =} + n_5(\omega_{52} + W_c) = 0$ $n_5 = n_4(\omega_{15} + \omega_{35} + \omega_{45}) + n_2(\omega_{25} + W_c)$
$\phantom{n_5 =} - n_5(\omega_{51} + \omega_{52} + \omega_{53} + \omega_{54} + W_c) = 0$ when all the relaxation rates, $\omega_{ij}$, are equal, and $\alpha\nu_{ij} \ll 1$, then by Kramers rule $$n_4 - n_2 = \frac{N3\alpha[R(a\nu_{13} - 2\nu_{23}) - \nu_{23}(5 + 4\alpha a\nu_{13} - 3\alpha\nu_{23})]}{\Delta}$$

where $$R = \frac{W_c}{\omega}$$

and $\Delta$ is a positive number involving products of transition frequencies, harmonic order $a$ and harmonic coupling term R. Therefore $n_4 > n_2$ when $R(a\nu_{13} - 2\nu_{23}) > \nu_{23}(5 + 4\alpha a\nu_{13} - 3\alpha\nu_{23})$ and maser action is allowed.

When the population density is such that $n_4$ is greater than $n_2$ maser operation is possible at a frequency $\nu_{42}$, which is greater than the pump frequency $\nu_{13}$. Of course, if energy levels E4 and E2 are inverted, then energy levels E3 and E2 are also inverted and maser operation at a frequency $\nu_{32}$ is also possible.

Referring again to FIG. 1, the pump source 18 provides a pump frequency of, for example, 70.80 gigacycles to the active material 10. The active material 10 is cut with its axis along the crystalline [110] direction so that the angles $\theta$ and $\phi$ can be independently varied by means of the quartz rod 14 which in turn is connected to a gear arrangement that allows mechanical rotation in a plane perpendicular to the cylindrical axis of the active material 10. More specifically, the active material 10 is orientated at an angle $\theta = 63°$ and $\phi = 42°$. The electromagnet 30 provides a homogeneous field H of very small variation at 6.735 kilogauss. A representative size of the active material 10 is 0.1 inch long by 0.1 inch in diameter with a ratio of Ti/Fe of $10^3$.

Due to the very high dielectric constant of rutile, the active material 10 may itself be used as a high Q dielectric resonant structure for both the pump and signal frequencies. When desired, liquid helium may be allowed to come in direct contact with the material 10 to insure temperature stability. Maser oscillations at the lower frequency $\nu_{32}$, is discouraged by making the samples small enough so that there is no high Q resonant cavities at that frequency.

With the rutile material 10 properly orientated in the magnetic field and with pump power at a frequency of 70.80 gigacycles, maser oscillation will occur at a frequency of 101.05 gigacycles. By applying a pump frequency equal to the transition frequency between energy levels E1 and E3 and energy levels E3 and E4 the populations densities of those energy levels will be equalized. At the same time, some spins are removed from the energy level E2 to the energy level E5 since the transition frequency of this pair of energy levels is a harmonic multiple of the pump frequency. For example, the transition frequency between the energy levels E2 and E5 is 141.60 gigacycles. With the active material 10 constructed to form a high Q dielectric resonant structure at the transition frequency dividing energy levels E4 and E2, a signal source 20 of 101.05 gigacycles entering through the circulator 24 will be amplified by stimulated emission by the maser and directed to a utilization load 26.

To show that the maser action was dependent upon the harmonic relationship between energy levels E2 and E5 and the pump frequency $\nu_{13}$, the active material 10 can be reorientated to a slightly different angle, for example $\theta = 63°$, $\phi = 40°$, and the magnetic field and pump frequency change so that $\nu_{13} = \nu_{34}$ will again be equal, it will be found that the transition frequency $\nu_{25}$ is not harmonically related. In such a position, it is not possible to obtain sufficient inversion between energy levels E4 and E2, and no maser oscillations are observed. Hence, it is readily apparent that the direct coupling of pump power for multi-level pumping of the energy level pairs E1–E3 and E3–E4 must be combined with the harmonic coupling of the energy levels E2–E5 in order that a signal frequency substantially greater than the pump frequency applied to the active material 10 may be extracted and utilized.

While the present invention was described with a degree of particularly for the purposes of illustration, it is to be understood that all alterations, modifications and substitutions within the spirit and scope of the present invention are herein meant to be included. For example, while the harmonic coupling has been illustrated to be twice the pump frequency, higher order harmonics of the pump frequency may also be utilized.

I claim as my invention:

1. In combination, an active material having at least five energy levels numerically designated in order of increasing magnitude; means for applying a field to substantially equalize the transition frequency between the first and third energy levels and the third and fourth energy levels and making the transition frequency between the second and fifth energy levels a harmonic multiple of the first mentioned transition frequency; means for applying to said active material saturating pump power at the first mentioned transition frequency to equalize the relative population density of the first, third and fourth energy levels and to increase the population of said fifth level while decreasing the population of said second level; and means for extracting energy from said active material at the transition frequency between the fourth and second energy levels.

2. In combination, an active material having a first pair of energy levels, a second pair of energy levels including one energy level of said first pair and a third pair of energy levels having one energy level disposed between said first pair and the other energy level disposed outside either said first and second pair; means for applying a field to make the transition frequency between said third pair of energy levels a harmonic multiple of the transition frequency of said first pair of energy levels and the transition frequency of said second pair of energy levels substantially equal to the transition frequency of said first pair of energy levels; means for applying to said active element saturating pump power at a frequency equal to the transition frequency of said first pair of energy levels to push-push pump said first and second pair of energy levels and harmonically couple said third pair of energy levels; and means for extracting energy from said active material at the transition frequency between the higher energy level of said second pair and the lower energy level of said third pair of energy levels.

3. The combination of claim 2 wherein said harmonic multiple is twice the transition frequency of said first pair of energy levels.

4. The combination of claim 2 wherein said active material is iron ions, $Fe^{3+}$, in a host crystalline structure of rutile, $TiO_2$.

5. In combination, an active material having at least five energy levels numerically designated in order of increasing magnitude; means for applying a magnetic field to said active material to arrange said energy levels such that the transition frequency between the first and third energy levels and the third and fourth energy levels are substantially equal and the transition frequency between the second and fifth energy levels is a harmonic multiple of the first mentioned transition frequency; means for direct coupling a pump source of a frequency equal to said first mentioned transition frequency and harmonically coupling the pump source to the second and fifth energy levels; and means for extracting energy at a frequency separating the fourth and second energy levels.

6. In combination, an active material of iron ion, $Fe^{3+}$, in a host crystalline structure of rutile, $TiO_2$; means for applying a field to said active material; means for orientating said active material in the field to cause a first pair of energy levels and a second pair of energy levels to be separated by a predetermined transition frequency and a third pair of energy levels to be separated by a transition frequency twice the first mentioned transition frequency, the second pair including one energy level of said first pair and the third pair having one energy level disposed between said first pair and the other energy level disposed outside either said first and second pair of energy levels; means for applying to said active material saturating pump power at the first mentioned transition frequency; and means for resonating the frequency separation between the higher energy level of said second pair and the lower energy level of said third pair while suppressing resonance of a frequency separating the lower energy level of said second pair and the lower energy level of said third pair of energy levels.

7. In combination, an active material having at least five energy levels designated in order of increasing magnitude $E1$, $E2$, $E3$, $E4$ and $E5$; means for applying a magnetic field to said active material; means for orientating said active material within said magnetic field to equalize the transition frequency between the $E1$ and $E3$ energy levels and the $E3$ and $E4$ energy levels and to make the transition frequency between the $E2$ and $E5$ energy levels equal to twice the first mentioned transition frequency; means for applying to said active material saturating pump power of said first mentioned transition frequency to equalize the relative population density of the $E1$, $E3$ and $E4$ levels and to delete the population density of the $E2$ energy level to a value which is less than the population density of the $E4$ energy level; and means for applying signal energy of a frequency equal to the transition between the $E4$ and $E2$ energy levels to said active material for amplification and for extracting the amplified signal for utilization.

No references cited.

ROY LAKE, *Primary Examiner.*